United States Patent
Harbison

(10) Patent No.: US 6,674,181 B2
(45) Date of Patent: Jan. 6, 2004

(54) WIND-DRIVEN TWIN TURBINE

(76) Inventor: Charles C. Harbison, 5001 Jay Ave., Las Vegas, NV (US) 89130

(*) Notice: Subject to any disclaimer, the term of this patent is extended or adjusted under 35 U.S.C. 154(b) by 100 days.

(21) Appl. No.: 10/032,424

(22) Filed: Dec. 31, 2001

(65) Prior Publication Data

US 2003/0122380 A1 Jul. 3, 2003

(51) Int. Cl.⁷ .................................................. F03D 3/00
(52) U.S. Cl. ........................................... 290/55; 290/44
(58) Field of Search ............................. 290/43, 44, 54, 290/55

(56) References Cited

U.S. PATENT DOCUMENTS

| | | | |
|---|---|---|---|
| 3,876,925 A | * 4/1975 | Stoeckert | 322/1 |
| 4,088,419 A | * 5/1978 | Hope et al. | 415/4.4 |
| 4,295,783 A | * 10/1981 | Lebost | 415/4.4 |
| 4,764,683 A | 8/1988 | Coombes | |
| 4,960,363 A | * 10/1990 | Bergstein | 415/3.1 |
| 5,038,049 A | 8/1991 | Kato | |
| 5,457,346 A | * 10/1995 | Blumberg et al. | 290/55 |
| 6,448,669 B1 | * 9/2002 | Elder | 290/54 |

* cited by examiner

Primary Examiner—Nicholas Ponomarenko
(74) Attorney, Agent, or Firm—Edgar W. Averill, Jr.

(57) ABSTRACT

A wind-driven turbine assembly useful for the generation of electricity. The turbine assembly has a frame which holds two parallel turbines supported by the top and floor of the frame. Each turbine has a central support pipe with turbine veins extending outwardly. The wind enters the front of the frame and is split into two streams which strike the outer blades of each of the two turbines, causing them to rotate in opposite directions. The frame has side doors which tend to open as wind velocity increases. The frame also has a back panel which also may be adjusted between open and closed positions. Electrical generators are operably connected to shafts of the turbine to convert the energy absorbed from the wind into electricity.

8 Claims, 4 Drawing Sheets

WIND-DRIVEN TWIN TURBINE

BACKGROUND OF THE INVENTION

The field of the invention is electrical generation and the invention relates more particularly to wind-driven electrical generation.

Wind has been used to drive machinery for centuries, but recently with the concern of greenhouse gas buildup, use of wind to generate electricity has received increasing interest. Wind generation is commercially used in many parts of the world and the most common style of commercial wind turbine generator utilizes a rotor, typically with three blades. The rotor typically turns a horizontally oriented shaft, which provides input to a gear box, which increases the rotation speed and turns a generator which converts the shaft power into electrical power. Usually, the pitch of the blades can be adjusted to regulate the speed during normal operation and also to shut down the machine when wind speeds are excessive. Most modern wind turbines start operating when wind speeds reach about 12 miles per hour and achieve their rated power at about 25–30 miles per hour and shut down at wind speeds above 35–40 miles per hour.

Unfortunately, a great deal of potential power generation is lost because of the necessity of shutting down the windmill in wind speeds above 35–40 miles per hour. Wind turbines which do not use rotor blades have been patented but have not found commercial application. One such design is shown in U.S. Pat. No. 4,764,683. The generator uses a pair of helical rotors positioned so that a portion of the blades extend beyond forward and rear "nacelles."

A vertical axis wind-powered generator is shown in U.S. Pat. No. 5,038,049. This device uses a cylindrical rotor having a vertical axis with a plurality of wind-driven veins. A curved inner modulator is mounted on the base inside the rotor to control the wind flow through the rotor. An inlet modulator is rotatably mounted on the base for controlling wind flow to the rotor.

BRIEF SUMMARY OF THE INVENTION

It is an object of the present invention to provide a wind-driven turbine which is capable of generating electricity without having to shut down in winds in excess of 40 miles per hour.

The present invention is for a wind-driven turbine assembly useful for the generation of electricity. The assembly has a frame with a front opening for the entrance of the flow of wind and the frame has a floor, a right side, a left side, and a back. A right and a left turbine are rotatably supported by the top and floor of the frame. Each of the right and left turbines have a vertically oriented central support pipe having a plurality of air passageways therethrough. A plurality of blades are held by each of the vertically oriented support pipes and the blades are generally vertically oriented and extend outwardly to an outward edge so that as each turbine rotates its outer edge subscribes a circle within the frame. Each such circle has an outer edge oriented near the respective right side and left side of the frame. Each central support pipe has an upper and a lower end support frame for providing support means for holding the support pipe in a vertical position and at least one of the upper and lower end support frame has openings to permit the flow of air outwardly from an inner area of the support pipe. A nose cone is supported vertically in the front opening of the frame, having a rightwardly oriented face and a leftwardly oriented face for diverting the flow of wind away from the center of the front opening to create a right air stream and a left air stream. A right side door and a left side door is each hingedly held across the right and left sides respectively of the frame by a vertical hinge positioned nearer the front opening of the frame than the back opening of the frame. These side doors are movable from a closed position angularly aggressively to let more wind pass between the outer edges of the blades and the respective side doors. Each side door is biased toward the closed position whereby a right side airstream flows against the blades of the right turbine and along the right side door, and a left side airstream flows against the blades of the left turbine and along the left side door, thereby urging the turbines to turn in opposite directions. A back panel is held across the central area of the back of the frame and this back panel, together with the top, bottom, right turbine, and left turbine, form a rear central space. Means are provided for releasing air from the rear central space to the outside of the frame. A right and a left adjustable baffle are held across the back of the frame adjacent the back panel and the right and left adjustable baffles are hingedly held at the right and left edges of the back panel. Means are provided for setting the amount of opening of the right and left adjustable baffles, whereby when a stream of air enters the front opening of the frame, such stream of air is directed by the nose cone into a right air stream and a left air stream. Part of the right and left air streams pass through the air passageways in the vertically oriented central support pipes of the right and left turbines and exit through the support pipe. Electrical generating means are operably connected to the turbines to produce electrical energy. A wide mesh screen is placed over the front opening to prevent the entry of large objects which would interfere with the rotation of the turbines. Baffles may be provided within the frame to direct the flow of air in an optimum manner. Front, right, and left wind baffles may be further provided to control the flow of air into the front opening. The outside diameter of the turbines is typically between 2 and 8 feet, with 8 to 30 blades in each turbine.

DESCRIPTION OF THE PREFERRED EMBODIMENTS

Figure 1:
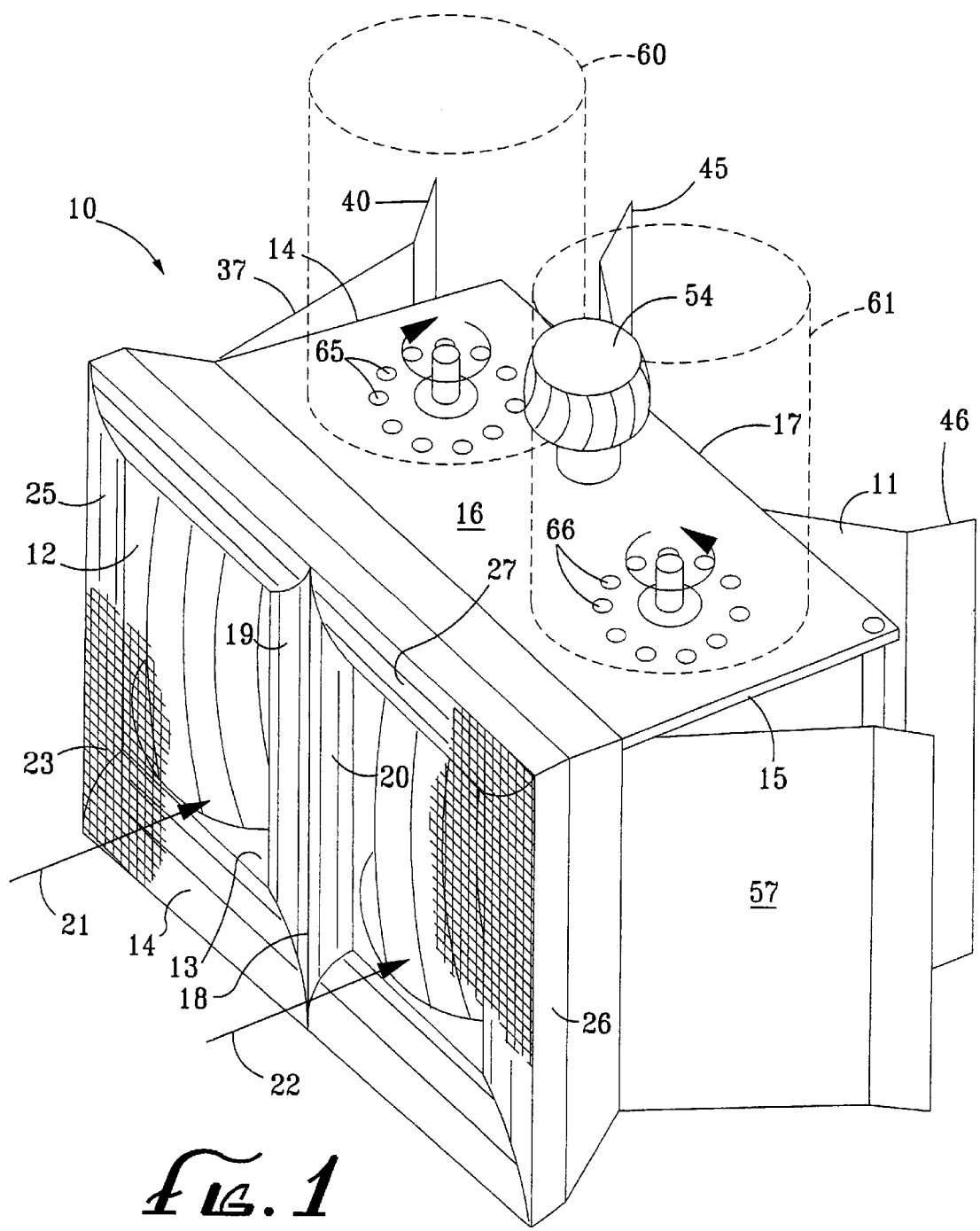
FIG. 1 is a perspective view showing the front, top, and right side of the wind-driven turbine assembly of the present invention.

The wind-driven turbine assembly of the present invention is shown in perspective view in FIG. 1 and indicated generally by reference character 10. Turbine assembly 10 has a frame 11 which has a front opening 12, a floor 13, a left side 14, a right side 15, a top 16, and a back 17. The front opening 12 has a nose cone 18. Nose cone 18 has a leftwardly oriented face 19 and a rightwardly oriented face 20.

Frame 11 is aimed so that the flow of wind enters the front opening 12. Two airstreams, namely a leftward airstream 21 and a rightward airstream 22, are diverted as shown in FIG. 2 toward the left and right sides of frame 11.

The front opening 12 of frame 11 is covered by a screen 23 to keep birds and other objects from entering the front opening 12. Front opening 12 preferably has angled faces 20 along the bottom opening, 25 and 26 along the left and right openings, and 27 along the top to help direct air inwardly into front opening 12.

Figure 2:
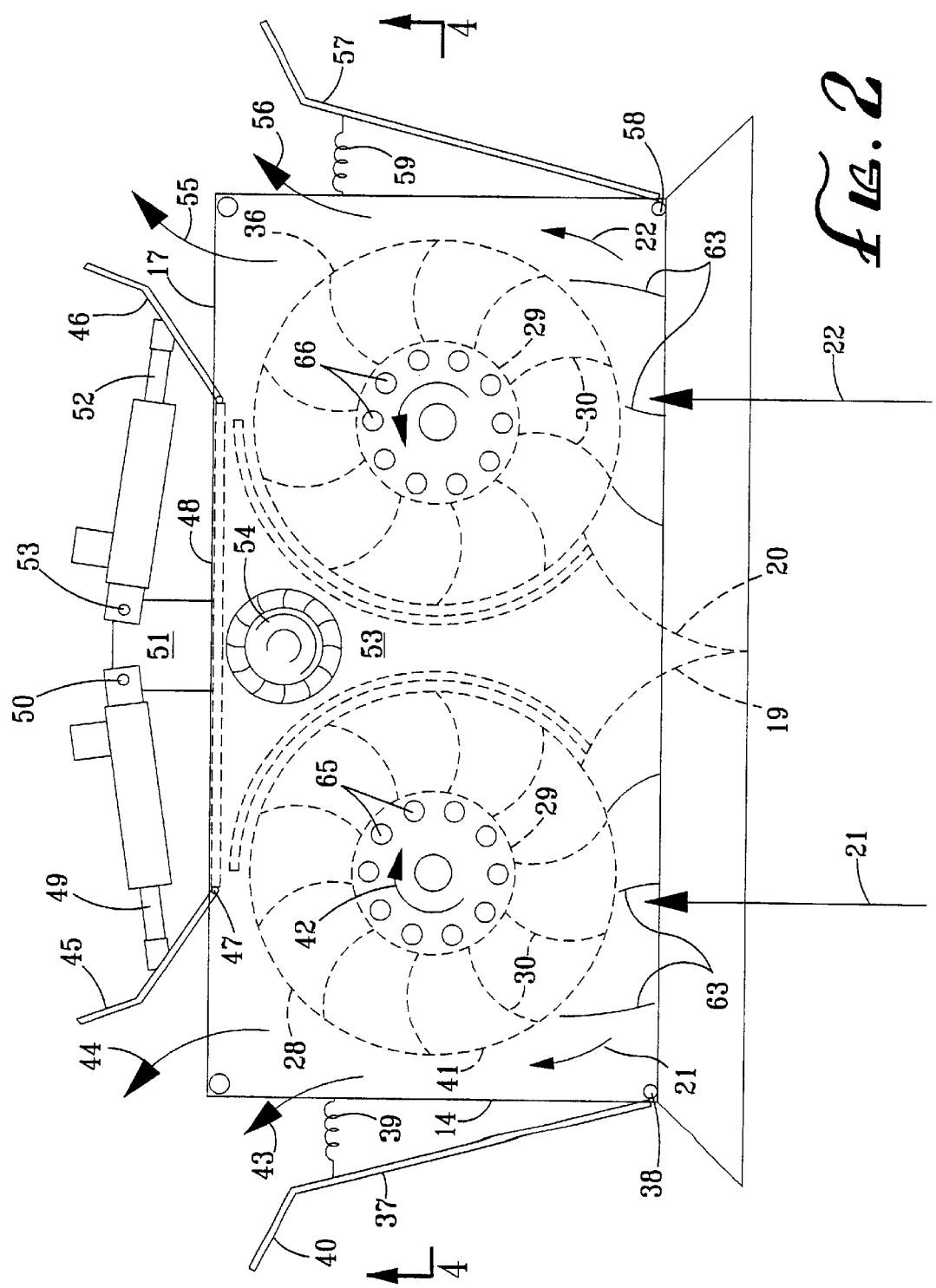
FIG. 2 is a top view thereof.
Figure 3:
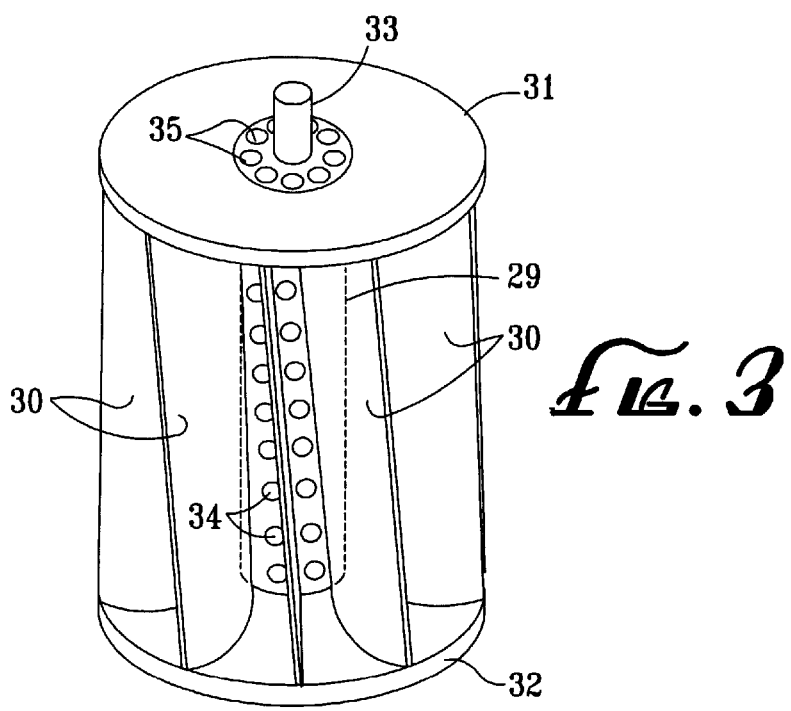
FIG. 3 is a perspective view of one of the turbines of the assembly of FIG. 1.

Turning now to FIG. 2, left turbine 28 is vertically mounted within frame 11 and has a vertically oriented central support pipe 29 from which a plurality of blades 30 are affixed. As shown in FIG. 3, the turbine has an upper end support frame 31 and a lower end support frame 32, which support the blades as well as the support and output shaft 33.

The vertically oriented central support pipe 29 has a plurality of air passageways 34 which permit the flow of air into the support pipe 29, and there are openings 35 on the top and/or bottom of the frame 31/32 to emit the flow of air from the interior of the support pipe to the exterior of the frame. Right turbine 36 has the identical features.

As shown in FIG. 2, left airstream 21 is directed by face 19 toward the left side 14 of the frame, which supports a left side door 37. Left side door 37 is hingedly connected at 38 to the left side of the frame near the front opening 12. Door 37 is biased toward a closed direction by spring 39 and preferably has an outwardly angled portion 40. As the flow of wind increases, door 37 is forced slightly more open so that excess may pass between the outer circle 41 subscribed by blades 30 and left side door 37. This flow of air turns left turbine 28 in a clockwise direction, as viewed in FIG. 2 and indicated by reference character 42. Left airstream 21 exits as indicated by arrows 43 and 44.

A second control is preferably provided by a pair of rear baffles 45 and 46. Left rear baffle 45 is hingedly connected at hinge 47 to a back panel 48 affixed to the back of the frame 17. A hydraulically or otherwise controlled arm 49 positions left rear baffle 45 and is pinned at 50 to frame member 51. Similarly, right rear baffle 46 is positioned by arm 52 and is operated by hydraulic or other motor means and is pivotally pinned at 53 to frame member 51. The position of the rear baffles helps direct the flow of air out through the side and rear of wind-driven turbine assembly.

An inner volume 53 exists between back panel 48 and the left and right turbines. Since air pressure tends to build in this area, an air vent 54, shown in FIG. 1, provides an outlet for any such air buildup.

Air entering the right side is diverted by face 20 and exits as indicated by arrows 55 and 56. Right side door 57 is hingedly connected at 58 to frame 11 and is biased by spring 59 toward a closed position.

Figure 4:
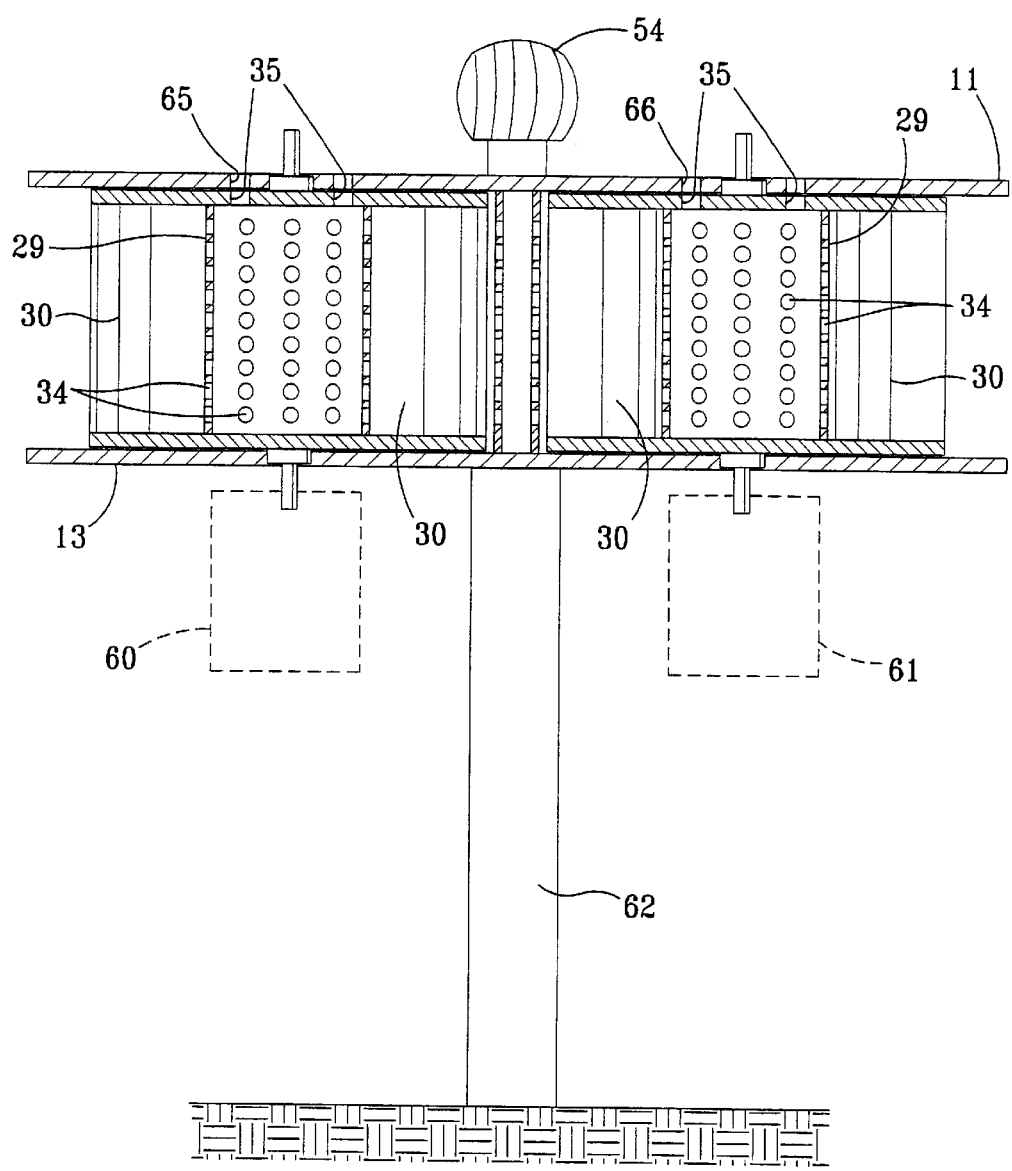
FIG. 4 is a cross-sectional view taken along line 4—4 of FIG. 2.

The openings in the vertically oriented central support pipe are shown in FIGS. 3 and 4. In FIG. 4 it can be seen that the generators 60 and 61 are positioned below frame 11, which is useful for maintenance for larger wind turbines, being more easily accessed from below.

Figures 5, 6:
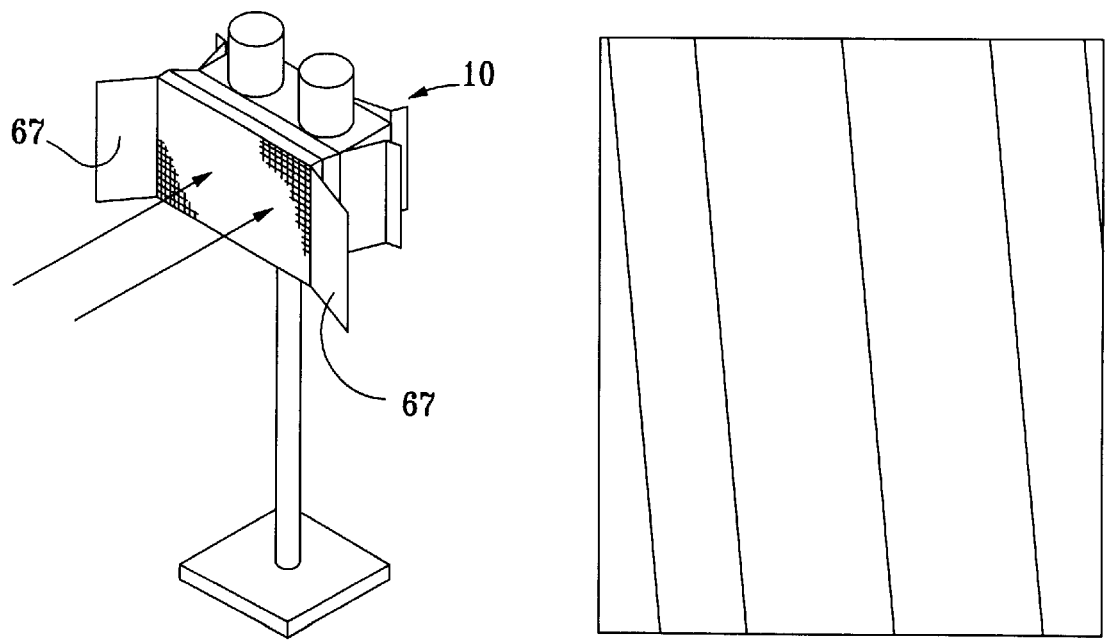
FIG. 5 is a side view of the right turbine of FIG. 2.
FIG. 6 is a perspective view of the wind-driven turbine assembly of FIG. 1 shown on a stand.

The wind turbine of the present invention can further contain controlled front baffles 67 as shown in FIG. 6. Fixed baffles, two of which are indicated in FIG. 2 by reference character 63, may be added to further direct the flow of wind through the frame. The blades, as shown in FIG. 2, are preferably curved and set at 60° to 90° with respect to the central support pipes. The turbines are anticipated to be capable of being made very large with a size range anticipated between 2 feet and 18 feet in outside diameter with a length between 3 feet and 20 feet. The number of blades per turbine is preferably between 8 and 30 blades with an anticipated minimum top RPM of 140.

The function of the holes in the center pipe is to get rid of dead air which forms as the turbines turn. The dead air can pass outwardly to the top of the frame as shown in FIG. 4 of the drawings through openings 65 and 66. It is anticipated that in cold climates, deicers utilizing hot water or steam may be used.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A wind driven turbine assembly useful for the generation of electricity comprising:

a frame having a front opening for the entrance of a flow of wind, said frame having a floor, a right side, a left side, a top and a back;

a right and a left turbine rotatably supported by the top and floor of said frame each of said right and left turbines:

having a vertically oriented central support pipe having a plurality of air passageways therethrough;

a plurality of blades held by each of said vertically oriented support pipes, said blades being generally vertically oriented and extending generally radially outwardly to an outer edge from said central support pipes so that as each turbine rotates its outer edge subscribes a circle within said frame, each circle having an outer edge orientated near the respective right side and left side of said frame;

each central support pipe having an upper and a lower end support frame for providing support means for holding the support pipe in a vertical position and at least one of said upper and lower end support frame having openings to permit the flow of air outwardly from an inner area of said support pipe;

a nose cone supported vertically in the front opening of said frame having a rightwardly oriented face and a leftwardly oriented face for diverting the flow of wind away from a center of said front opening of said frame to create a right air stream and a left air stream;

a right side door and a left side door each hingedly held across the right and left sides respectively of said frame by a vertical hinge positioned nearer the front opening of the frame than the back of the frame said right side door and said left side door being movable from a closed position angularly progressively to let more wind pass between the outer edges of said blades and the respective side door, each side door being biased toward a closed position whereby a right side air stream flows against the blades of said right turbine and along said right side door and a left side air stream flows against the blades of said left turbine and along said left side door thereby urging said turbines to turn in opposite directions;

a back panel held across a central area of said back of said frame, said back panel, said top, bottom said right turbine and said left turbine forming a rear central space, said back panel having a right edge and a left edge;

means for releasing air from said rear central space to the outside of said frame;

a right and a left adjustable baffle are held across the back of said frame adjacent said back panel, said right and left adjustable baffles each hingedly held at said right edge and said left edge of said back panel; and means for setting the amount of opening of said right and left adjustable baffles whereby when a stream of air enters the front opening of the frame, such stream is directed by the nose cone into a right air stream and a left air stream, the right air stream passing against turbine blades on the right side of the support pipe of the right turbine and against the right side door and against the right side baffle, a portion of the air stream passing through said air passageways in said vertically oriented central support pipe of the right turbine and the left air stream passing against turbine blades oh the left side of the support pipe of the left turbine and against the left side door and against the left side baffle, a portion of the air stream passing through said air passageways in said vertically oriented central support pipe of the left turbine; and electrical generating means operably connected to said right turbine and said left turbine to produce electrical energy.

2. The wind driven turbine assembly of claim 1 wherein said right side door and said left side door are each biased toward a closed position by a right side spring and a left side spring.

3. The wind driven turbine assembly of claim 2 wherein said right side door and said left side door are independently controllable.

4. The wind driven turbine assembly of claim 1, further including a screen positioned over said front opening.

5. The wind driven turbine assembly of claim 1, further including a right front door and a left front door affixed hingedly to the right side and left side of said frame at the front thereof.

6. The wind driven turbine assembly of claim 1, further including a plurality of fixed baffles held within said frame in said right air stream and said left air stream, to guide the flow of said right and left air streams within the frame.

7. The wind driven turbine assembly of claim 1, wherein the outside diameter of said right and said left turbine is between 2 and 18 feet.

8. The wind driven turbine assembly of claim 1, wherein said right and said left turbine each contain between 8–30 blades.

* * * * *